(12) United States Patent
Scholl

(10) Patent No.: US 7,441,934 B2
(45) Date of Patent: Oct. 28, 2008

(54) LAMP SYSTEM

(75) Inventor: Robert Peter Scholl, Roetgen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 133 days.

(21) Appl. No.: 10/570,543

(22) PCT Filed: Sep. 1, 2004

(86) PCT No.: PCT/IB2004/051652

§ 371 (c)(1),
(2), (4) Date: Mar. 3, 2006

(87) PCT Pub. No.: WO2005/024478

PCT Pub. Date: Mar. 17, 2005

(65) Prior Publication Data

US 2007/0081780 A1    Apr. 12, 2007

(30) Foreign Application Priority Data

Sep. 11, 2003    (EP)    ................... 03103350

(51) Int. Cl.
*F21V 7/04*    (2006.01)
(52) U.S. Cl. ................. 362/613; 362/615; 362/610
(58) Field of Classification Search ............ 362/613, 362/606, 612, 614, 610, 231, 26, 27, 29, 362/615, 601, 607, 582, 561, 558, 555, 800; 349/68, 61–65
See application file for complete search history.

(56) References Cited

U.S. PATENT DOCUMENTS

| | | | | | |
|---|---|---|---|---|---|
| 4,811,507 | A | * | 3/1989 | Blanchet | 40/546 |
| 5,143,433 | A | * | 9/1992 | Farrell | 362/29 |
| 5,211,463 | A | * | 5/1993 | Kalmanash | 362/26 |
| 5,779,338 | A | * | 7/1998 | Ishikawa et al. | 362/625 |
| 6,386,720 | B1 | * | 5/2002 | Mochizuki | 362/27 |
| 6,547,408 | B1 | * | 4/2003 | Greiner | 362/625 |
| 6,568,819 | B1 | * | 5/2003 | Yamazaki et al. | 362/619 |
| 6,672,733 | B2 | * | 1/2004 | Nagatani | 362/614 |
| 6,827,456 | B2 | * | 12/2004 | Parker et al. | 362/629 |
| 6,854,857 | B2 | * | 2/2005 | Hara et al. | 362/613 |
| 6,885,360 | B2 | * | 4/2005 | Hara et al. | 345/102 |
| 6,943,857 | B2 | * | 9/2005 | Tsubokura et al. | 349/112 |
| 7,001,035 | B2 | * | 2/2006 | Kawakami | 362/617 |
| 7,258,966 | B2 | * | 8/2007 | Chao et al. | 430/320 |
| 7,274,847 | B2 | * | 9/2007 | Gowda et al. | 385/117 |
| 7,278,775 | B2 | * | 10/2007 | Yeo et al. | 362/627 |
| 2003/0210222 | A1 | * | 11/2003 | Ogiwara et al. | 345/103 |

FOREIGN PATENT DOCUMENTS

DE    200 07 134 U1    9/2000

* cited by examiner

*Primary Examiner*—Sandra L. O'Shea
*Assistant Examiner*—Gunyoung T. Lee

(57) ABSTRACT

A lamp system has a first light source which radiates light of a first chromaticity coordinate and a second light source which radiates light of a second chromaticity coordinate. The lamp system also includes an optical component for additively mixing the light of the two light sources. The optical component includes an optical waveguide with two different kinds of scattering centers for mixing the light as desired.

13 Claims, 3 Drawing Sheets

LAMP SYSTEM

Figure 1:
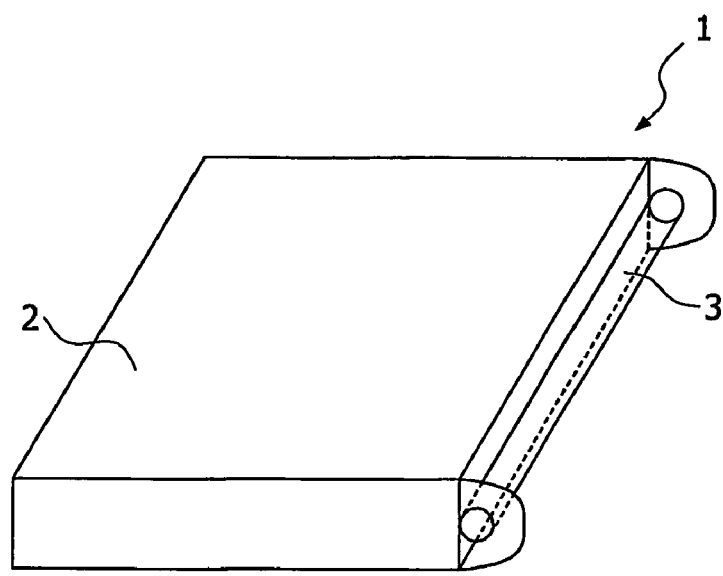

The invention relates to a lamp system with a first light source which radiates light of a first chromaticity coordinate and with a second light source which radiates light of a second chromaticity coordinate, and with an optical component for additively mixing the light of the two light sources.

Such a lamp system is known from DE 200 07 134 U1. A homogeneous mixing of the radiation of the light sources is achieved in that the lamp system radiates indirect light from all light sources at least partly. The directly emitted light of all light sources is incident on a deflection means, for example on a reflector, diffuser, or simply on the inner wall of the housing of the luminaire, whereby the radiation path is modified.

The invention accordingly has for its object to provide a simple possibility of light mixing.

According to the invention, the optical component comprises an optical waveguide with two different scattering centers. First scattering centers scatter light from the first light source and second scattering centers scatter light from the second light source. Light can be mixed as desired in this manner.

Light mixing thus takes place by coupling-in into a planar optical waveguide. In such a waveguide, the light is totally reflected until it hits a scattering center, also denoted scattering point hereinafter. The scattering center may be on the surface of the planar optical waveguide or in the interior thereof.

A homogeneous luminance distribution is achieved in that the density of the scattering points varies. It increases with an increasing distance from the first light source, a fluorescent lamp in this case. If two light sources of different colors are at a distance from one another, mixing of the light of the light sources of different colors into a white, homogeneous light source now leads to the problem that the one color is indeed homogeneously coupled out by means of the difference in scattering point density, but the other color is inhomogeneously coupled out by this scattering point density. If two different scattering centers are introduced, the one kind of scattering center scattering only light from the first light source and the other one light from the second light source, a homogeneous distribution can be achieved, and in particular white light can also be coupled out. The second kind of scattering center may yet be formed by two sub-types if one of the light sources radiates light with two different wavelengths, such that the one sub-type scatters green by preference and the other one blue.

A possible effect by which such a color-selective scattering can be achieved is the so-called Mie scattering. The Mie theory states that the scattering behavior changes strongly when the particle size approximates the value of the wavelength to be scattered, or is smaller than the wavelength of the light to be scattered. In this case, the scattering coefficient depends on the size and shape of the scattering centers.

Figure 2:
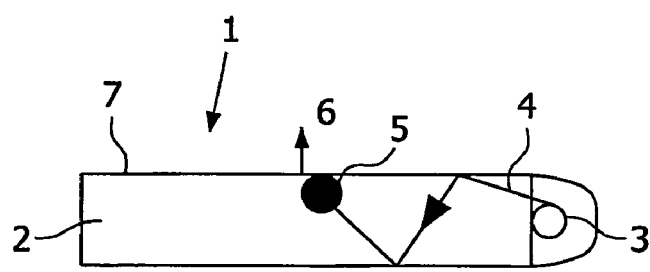
Figure 3:
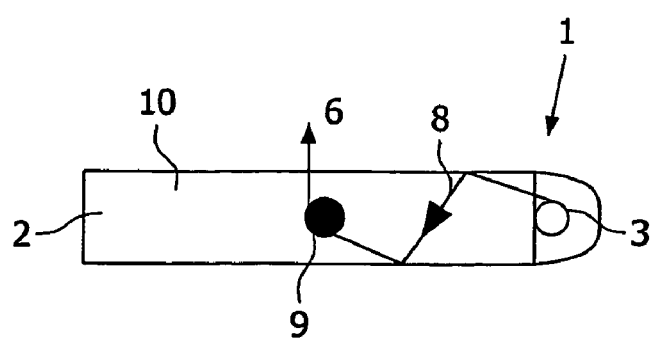
Figure 4:
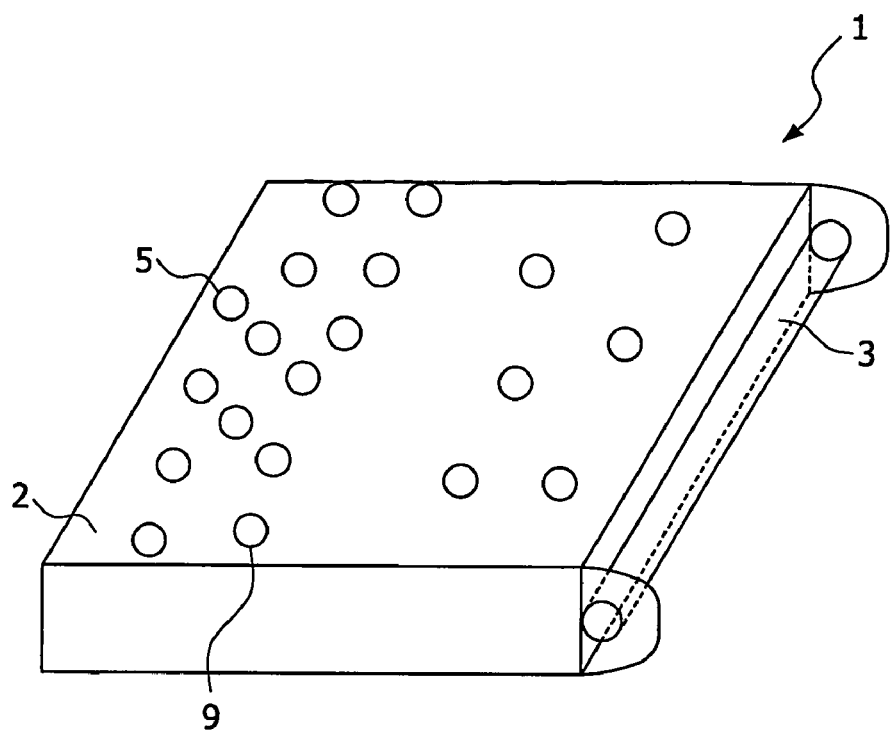
Figure 5:
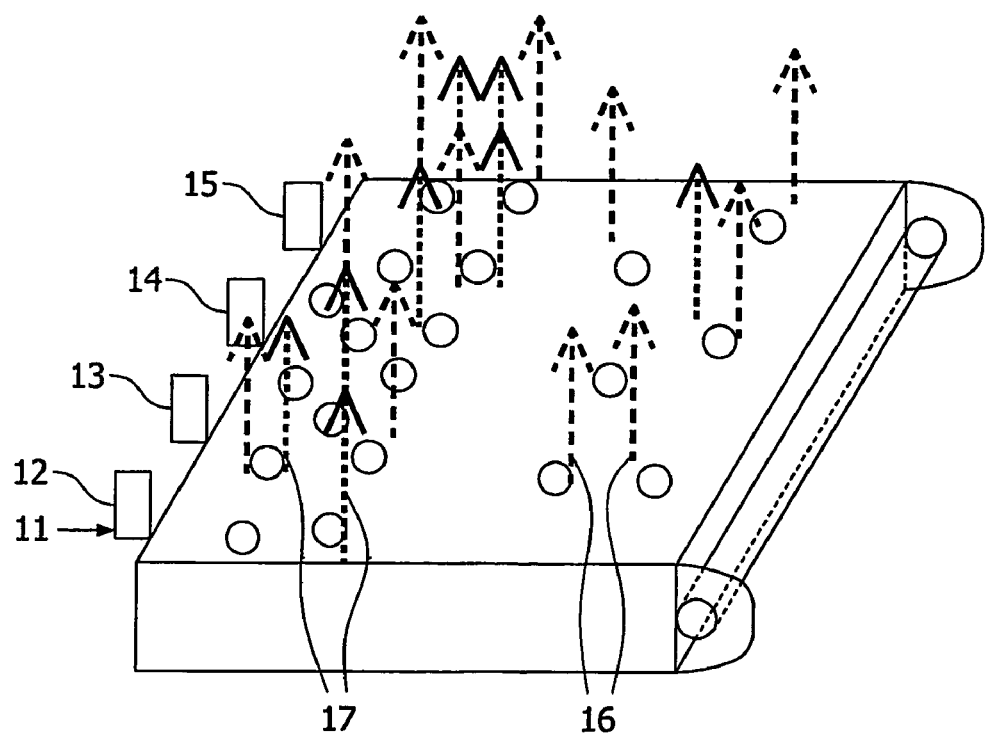
Figure 6:
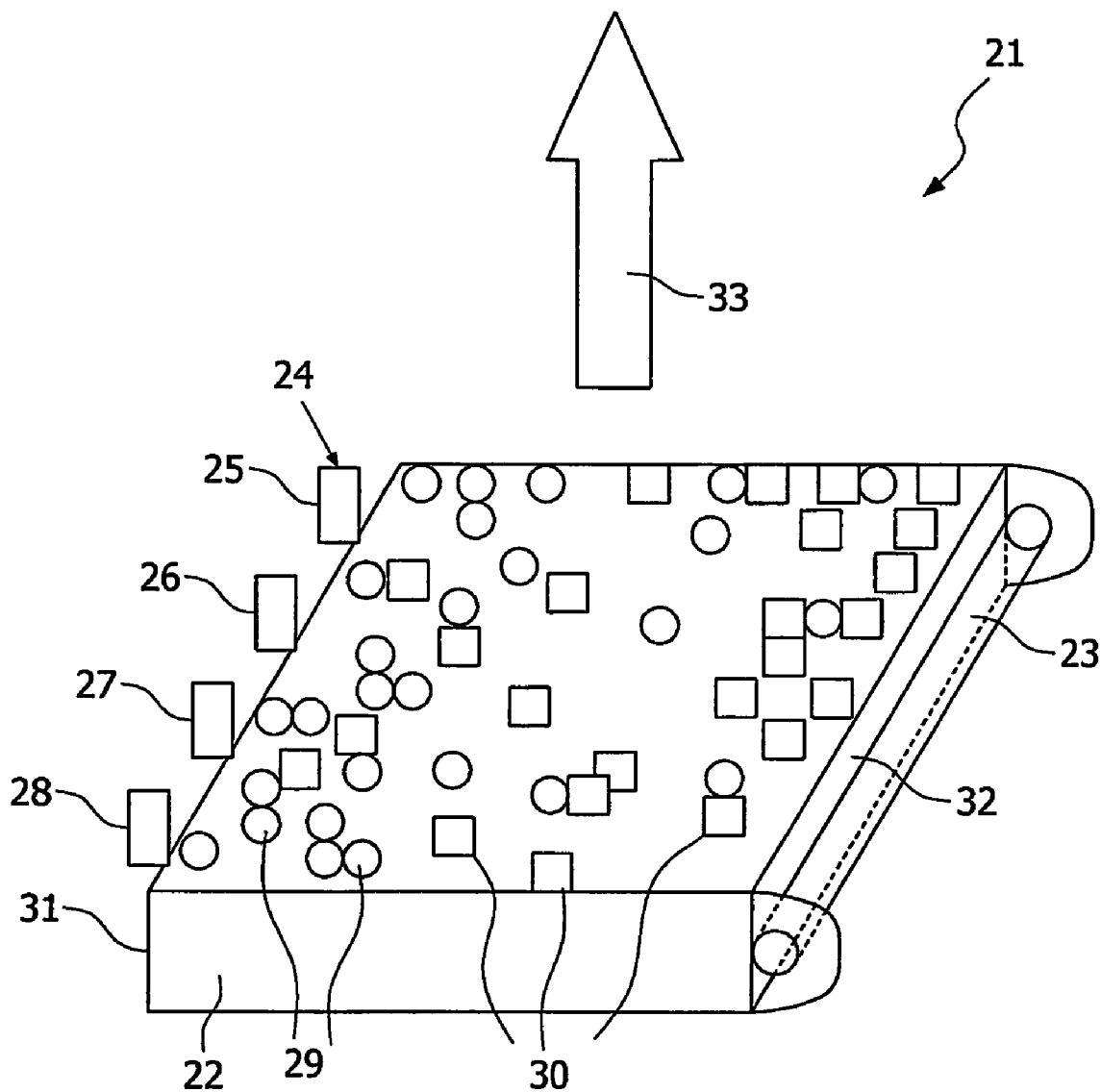

The invention will now be explained in more detail below with reference to an embodiment and to the drawing, in which:

FIG. 1 shows a planar optical waveguide with a light source in perspective view, FIG. 2 shows the optical waveguide with the light source and a scattering center in lateral cross-section, FIG. 3 shows the optical waveguide with the light source and a second scattering center in lateral cross-section, FIG. 4 shows the optical waveguide with the light source and with scattering centers in perspective view, FIG. 5 shows the optical waveguide with two different light sources arranged at a distance from one another and with scattering centers in perspective view, and FIG. 6 shows the optical waveguide with two light sources and with different scattering centers in perspective view.

FIG. 1 shows a lamp system 1 with a planar optical waveguide 2 and a light source 3 which is constructed as a fluorescent lamp.

FIG. 2 shows the lamp system 1 with the optical waveguide 2 and the fluorescent lamp 3, which emits a light ray 4 that is passed on by a scattering center 5 into a space 6 that is to be illuminated. The scattering center 5, also denoted scattering point below, is provided at a surface 7 of the optical waveguide 2.

FIG. 3 shows the lamp system 1 with the optical waveguide 2 and the fluorescent lamp 3, which emits a second light ray 8 which is passed on by a scattering center 9 into the space 6 to be illuminated. The second scattering center 9 is arranged in an interior 10 of the optical waveguide 2.

FIG. 4 shows the lamp system 1 with the optical waveguide 2 and the fluorescent lamp 3. The optical waveguide 2 comprises scattering centers 5 and 9, wherein a density of these scattering centers 5, 9 varies. The scattering center density increases with an increase in distance to the fluorescent lamp 3. It is possible in this manner to distribute the blue-green light of the fluorescent lamp 3 homogeneously.

FIG. 5 shows the optical waveguide 2 with the fluorescent lamp 3 and a second light source 11, which is formed by four red light-emitting diodes or LEDs 12 to 15. Light rays 16 originate from the fluorescent lamp 3, and light rays 17 originate from the LEDs 12 to 15 of the light source 11. The inhomogeneous density distribution of the scattering points 5 and 9 leads to a homogeneous blue-green light distribution, but to an inhomogeneous red light distribution. The color red is inhomogeneously coupled out.

FIG. 6 shows a lamp system 21 with an optical waveguide 22, a fluorescent lamp 23, and a second light source 24 comprising several red LEDs 25 to 28, and two different scattering centers 29 and 30. The scattering centers 29 deflect substantially blue-green light rays of the fluorescent lamp 23. The density of the scattering centers 29 increases with their distance to the fluorescent lamp 23. The scattering centers 30 deflect substantially red light rays from the red LEDs 25 to 28 of the light source 24. The density of the scattering centers 30 increases as their distance to the light source 24 increases. The light sources 23 and 24 are arranged at two mutually opposed sides 31 and 32 of the optical waveguide 22. The arrangement and the density of the scattering centers 29 and 30 are accordingly chosen such that the optical waveguide 22 radiates white light in a direction 33.

LIST OF REFERENCE NUMERALS 1 lamp system
2 planar optical waveguide
3 fluorescent lamp
4 light ray
5 scattering center
6 space
7 surface
8 light ray
9 scattering center
10 interior
11 light source
12 LED
13 LED
14 LED 15 LED
16 light rays
17 light rays
18
19
20
21 lamp system
22 optical waveguide
23 fluorescent lamp
24 second light source
25 red LED
26 red LED
27 red LED
28 red LED
29 scattering center
30 scattering center
31 lateral side
32 lateral side
33 direction

The invention claimed is:

1. A lamp system comprising:
a first light source which radiates a first light of a first chromaticity coordinate;
a second light source which radiates a second light of a second chromaticity coordinate which is different from the first chromaticity coordinate; and
an optical component for additively mixing the first light and the second light to form an output light having a third chromaticity coordinate which is different from the first chromaticity coordinate and from the second chromaticity coordinate;
wherein the optical component comprises an optical waveguide with scattering centers disposed, commingled in a body of the optical waveguide, scattering centers being of different kinds including a first kind of scattering centers associated with the first light source for scattering substantially only the first light of the first chromaticity coordinate and a second kind of scattering centers associated with the second light source for scattering substantially only the second light of the second chromaticity coordinate.

2. The lamp system of claim 1, wherein the optical waveguide is of planar construction.

3. The lamp system of claim 1, wherein the first light and the second light are coupled into the optical waveguide.

4. The lamp system of claim 1, wherein the scattering centers are arranged on a surface of the optical waveguide.

5. The lamp system of claim 1, wherein the scattering centers are arranged in an interior of the optical wave guide.

6. The lamp system of claim 1, wherein a density of the scattering centers varies.

7. The lamp system of claim 6, wherein the density of the scattering centers increases with an increasing distance to a respective one of the first light source and the second light source.

8. The lamp system of claim 1, wherein the first light source comprises a fluorescent lamp, and the second light source comprises a light-emitting diode.

9. The lamp system of claim 8, wherein the fluorescent lamp radiates blue-green light.

10. The lamp system of claim 8, wherein the light-emitting diode radiates red light.

11. The lamp system of claim 1, wherein a number of the first kind of scattering centers increases with an increasing distance to the first light source.

12. The lamp system of claim 1, wherein a first number of the first kind of scattering centers near the second light source is greater than a second number of the first kind of scattering centers near the first light source.

13. The lamp system of claim 1, wherein at least one of a number of the first kind of scattering centers increases with an increasing distance to the first light source and a number of the second kind of scattering centers increases with an increasing distance to the second light source.

* * * * *